H. G. PAPE.
MECHANICAL MOVEMENT.
APPLICATION FILED OCT. 19, 1917.
1,314,696.
Patented Sept. 2, 1919.
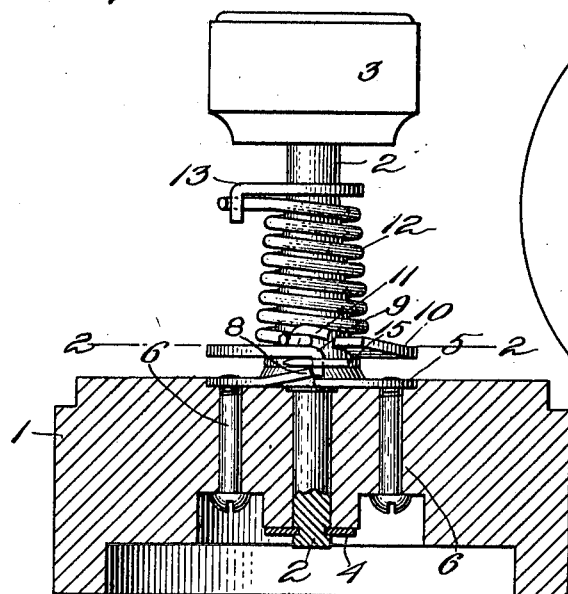
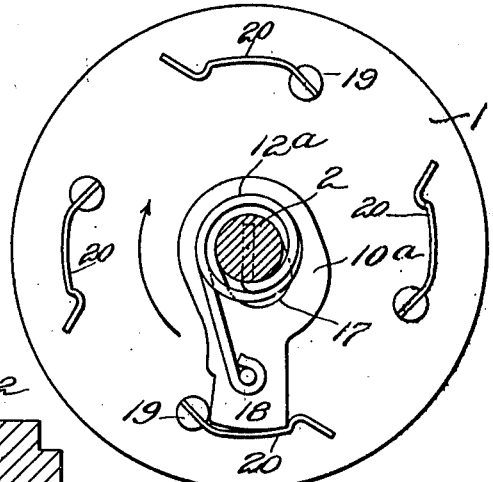
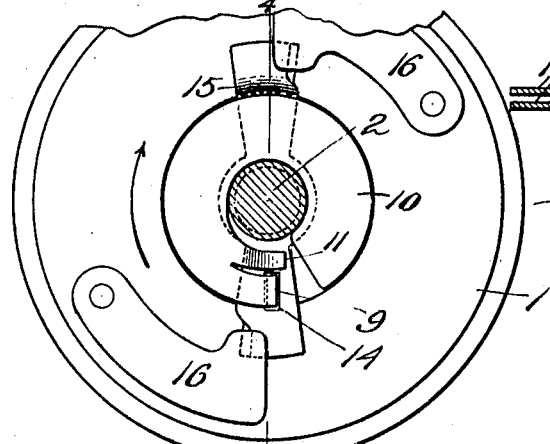
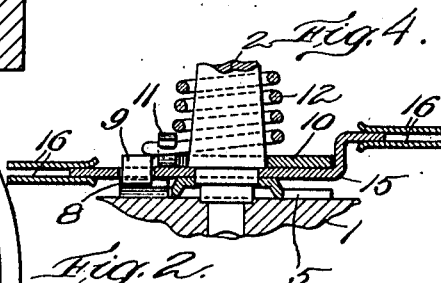
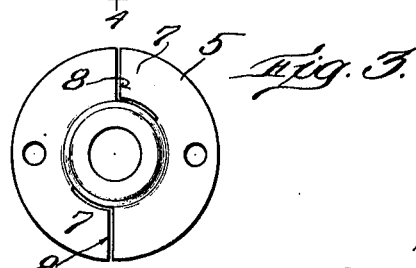
Inventor:
Herman G. Pape
by George A. Rockwell
Atty.

UNITED STATES PATENT OFFICE.

HERMAN G. PAPE, OF NEW YORK, N. Y., ASSIGNOR, BY MESNE ASSIGNMENTS, TO BEAVER MACHINE AND TOOL CO., INC., OF NEWARK, NEW JERSEY, A CORPORATION OF NEW JERSEY.

MECHANICAL MOVEMENT.

1,314,696.      Specification of Letters Patent.      Patented Sept. 2, 1919.

Application filed October 19, 1917. Serial No. 197,494.

*To all whom it may concern:*

Be it known that I, HERMAN G. PAPE, of New York city, in the county and State of New York, have invented a new and useful Mechanical Movement, of which the following is a specification.

The main object of my invention is to provide a simple and efficient mechanical movement in which motion is conveyed from the driving member to the driven member by means of a spring.

A feature of my invention is a spring which is wound up in one direction to change its length in another direction.

Another feature is a spring which is wound up by the driving member to free the driven member from a stop and then acts to move the driven member.

Other features will be pointed out below.

In the drawing—

Figure 1, is an elevation, partly in section, of a structure embodying my new mechanical movement.

Fig. 2 is a section on line 2—2 of Fig. 1 but with the spring removed.

Fig. 3 is a plan view of the stop member hereinafter described.

Fig. 4 is a partial section on line 4—4 of Fig. 2.

Fig. 5 shows a modification.

Having reference to the drawings, 1 represents the base or body of an electric switch embodying my new mechanical movement. This base 1 is made with a central aperture within which is journaled the lower end of a stem 2 that is provided at its upper end with a thumb piece or head 3 by means of which said stem is manually rotated. The stem is locked in position against endwise displacement relatively to base 1 by a washer or key 4 occupying a groove provided at the lower end of said stem. Fitted into a countersink provided upon the top side of base 1 is a stop plate 5, Fig. 3, made with two threaded holes through it to receive two screws 6 by means of which said plate is fastened in position within said countersink. Stop plate 5 is made with two tongues 7 spaced 180° apart and having their free ends bent upwardly to provide two stop shoulders 8 which coöperate with a tang or tooth 9 provided upon a latch member 10. This latch member 10 constitutes the movable or actuated member of my new movement and is herein shown as substantially like a split washer loosely surrounding stem 2 so that it can rotate and rock thereon to a limited extent. A hook 11 provided on member 10 is permanently engaged with the lower end of a coiled spring 12 loosely surrounding stem 2 whose upper end is fastened to an arm 13 projecting from stem 2.

When the stem 2 is rotated in the direction of the arrow, Fig. 2, the tooth 9 engages one of the stop shoulders 8 thus preventing the rotation of the member 10 with the result that spring 12 is wound up. As the spring is wound up its length in the direction of its axis shortens and since the upper end thereof is anchored to the arm 13, the lower end of the spring will be drawn upward carrying with it the member 10 and lifting the tang or tooth 9 toward the top of shoulder 8. By the time the end of this tang or tooth reaches the top of shoulder 8 the spring is wound up to such an extent that as soon as tooth 9 clears shoulder 8 said spring rotates member 10 quickly, and with a snappy movement, in the direction of the arrow, carrying the tooth 9 around to the opposite shoulder 8 by which its further movement, is arrested. The partial unwinding movement of the spring permitted by the freeing of tooth 8 lengthens the spring sufficiently to cause said tooth to engage said opposite shoulder 8. Thus if the rotation of stem 2 in the direction of the arrow is prolonged or continued the member 10 would intermittently move in the same direction, that is, step by step, making one half of a revolution at each step movement.

In the drawings I have shown the tooth 9 as extending down through a hole 14 provided in a contact member or bridge piece 15 loosely mounted to swing on stem 2 between member 10 and stop plate 5. This bridge piece has its ends bent so as to be relatively offset to adapt them to coöperate with two pair of relatively offset stationary circuit contacts 16 each arranged opposite one of the stop shoulders 8 so that they are engaged and bridged by bridge piece 15 to close a circuit only when tooth 9 is in engagement with one of said stop shoulders 8 and are left disconnected so as to open the circuit when said tooth is in engagement with the opposite stop shoulder 8.

In Fig. 5 the stem extends through a slot 17 provided in the actuated member 10ª which, in this instance, is a flat plate of metal made also with an arm 18 coöperating with four stops 19 projecting from a base 1ª. A coiled spring 12ª surrounding the stem 2 immediately above member 10ª has its upper end thereof fastened to said stem and its lower end fastened to the arm 18 near the free end thereof. When the stem 2 is rotated in the direction of the arrow, Fig. 5, the spring 12ª is wound up and at the same time the lower extremity thereof is drawn toward stem 2 carrying member 10ª with it. Member 10ª continues to be thus drawn inwardly as the stem is rotated until its outer end clears the stop 19 against which it rests whereupon the spring 12ª swings said member around stem 2 in the direction of the arrow. As the member 10ª thus moves around said stem the unwinding of the spring 12ª shoves said member outwardly so that it strikes and is arrested by the next stop 19. Each stop 19 has projecting from it a spring latch 20 which prevents backward movement of member 10ª.

What I claim is:

1. A mechanical movement comprising a driving member; a driven member; and a spring stressed in one direction by the driving member to change the length of the spring in another direction, said spring actuating the driven member.

2. A mechanical movement comprising a driving member; a driven member; a stop normally holding the driven member against movement; and a spring connecting said members, said spring being stressed by the driving member and acting when so stressed to free the driven member from the stop and move the driven member.

3. A mechanical movement comprising a rotatable driving member; a rotatable driven member; a stop normally holding the driven member against rotation; and a spring connecting said members, said spring being stressed by rotation of the driving member alone and acting when so stressed to free the driven member from the stop and rotate the driven member.

4. A mechanical movement comprising a rotatable driving member; a rotatable driven member; a stop normally holding the driven member against rotation; and a coiled spring connecting said members, said spring being contracted when wound by rotation of the driving member and operating by its contraction to free the driven member from the stop and rotate the driven member.

5. A mechanical movement comprising a rotatable driving member; a rotatable driven member; a stop normally holding the driven member against rotation; and a coiled spring connected at one end with said driving member and at its opposite end with said driven member, rotation of said driving member acting to wind up the spring and at the same time shorten the length thereof to free the driven member from said stop to permit the spring to rotate said driven member.

6. A mechanical movement comprising a driving member consisting of a rotatably supported stem; a driven member rotatably supported by said stem; a spring surrounding said stem and having one end connected with said stem and the other end with said driven member; a fixed stop normally holding the driven member against rotation, said spring being wound up when said stem is rotated to free the driven member from the stop and rotate said member, the unwinding of said spring when it rotates said member causing said driven member to move to stop-engaging position.

7. A mechanical movement comprising a driving member consisting of a rotatably-supported stem; a driven member rotatably supported by said stem; a spring surrounding said stem having one end thereof connected with the driving member and the opposite end connected with said driven member; a pair of fixed stops with which said driven member is normally held in coöperative relation by said spring so that said driven member is normally held against rotation by one of said stops, rotation of said driving member acting to wind up the spring and free the driven member from its stop so that the tension of the spring rotates the driven member and causes it to be arrested by the other stop.

8. A mechanical movement comprising a rotatable driving member; a rotatable driven member; a stop normally holding the driven member against rotation; and a spring connecting said members, said spring being coiled in conical form and being stressed by rotation of the driven member and acting when so stressed to free the driven member from the stop and rotate the driven member.

9. A mechanical movement comprising a driving member; a rotatable driven member; a stop normally holding the driven member against rotary movement; and a spring connecting said members, said spring normally tending to rotate said driven member and being stressed by rotation of said driving member and when so stressed moving said driven member along the axis of the latter to free it from said stop and then acting to rotate said driven member.

10. A mechanical movement comprising a rotatable driving member; a rotatable driven member; a stop normally holding the driven member against rotary movement; and a coiled spring connecting said members, said spring normally tending to rotate said driven member and being shortened in the direction of the axis of its coil by rotation of the driving member, said shortening moving the driven member along its own axis to free it from said stop, said spring then acting to rotate said driven member.

HERMAN G. PAPE.

Copies of this patent may be obtained for five cents each, by addressing the "Commissioner of Patents, Washington, D. C."